(12) United States Patent
Blake et al.

(10) Patent No.: US 10,565,600 B2
(45) Date of Patent: Feb. 18, 2020

(54) TECHNIQUES FOR CHANNEL-INDEPENDENT OFFER MANAGEMENT

(71) Applicant: NCR Corporation, Duluth, GA (US)

(72) Inventors: Norman Perkins Blake, Suwanee, GA (US); Vincent Robert Koser, West Lafayette, IN (US); Robert Eugene Dusek, Saint Paul, MN (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/670,333

(22) Filed: Aug. 7, 2017

(65) Prior Publication Data

US 2017/0337564 A1    Nov. 23, 2017

Related U.S. Application Data

(62) Division of application No. 13/601,020, filed on Aug. 31, 2012, now Pat. No. 9,754,270.

(51) Int. Cl.
*G06Q 30/00* (2012.01)
*G06Q 30/02* (2012.01)

(52) U.S. Cl.
CPC .................... *G06Q 30/02* (2013.01)

(58) Field of Classification Search
None
See application file for complete search history.

(56) References Cited

U.S. PATENT DOCUMENTS

| | | | | |
|---|---|---|---|---|
| 5,978,813 A * | 11/1999 | Foltz | ...................... | H04L 29/06 |
| 7,711,600 B1* | 5/2010 | Curran | ................. | G06Q 10/087 |
| | | | | 705/16 |
| 2001/0034775 A1* | 10/2001 | Minowa | ............... | G06Q 20/387 |
| | | | | 709/218 |
| 2002/0138399 A1* | 9/2002 | Hayes | ................... | G06Q 40/04 |
| | | | | 705/37 |
| 2003/0083955 A1* | 5/2003 | Ookura | ................. | G06Q 30/02 |
| | | | | 705/26.1 |
| 2004/0006506 A1* | 1/2004 | Hoang | .................. | G06Q 10/10 |
| | | | | 705/14.65 |
| 2004/0041022 A1* | 3/2004 | Minowa | ................ | G06Q 30/02 |
| | | | | 235/383 |
| 2004/0230659 A1* | 11/2004 | Chase | ............... | H04L 29/06027 |
| | | | | 709/206 |
| 2005/0033689 A1* | 2/2005 | Bonalle | .................. | G06Q 20/00 |
| | | | | 705/40 |
| 2005/0284933 A1* | 12/2005 | McGill | ................. | G06Q 30/06 |
| | | | | 235/383 |
| 2006/0059185 A1* | 3/2006 | Bocking | ................ | G06Q 10/10 |
| 2006/0178980 A1* | 8/2006 | Goldberg | ............... | G06Q 30/06 |
| | | | | 705/37 |
| 2006/0271600 A1* | 11/2006 | Goh | ...................... | G06F 16/275 |
| 2008/0005263 A1* | 1/2008 | Baraev | ............. | H04L 29/12122 |
| | | | | 709/217 |

(Continued)

*Primary Examiner* — Matthew T Sittner
(74) *Attorney, Agent, or Firm* — Schwegman, Lundberg & Woessner

(57) ABSTRACT

Techniques for channel-independent offer management are provided. An offer management server can be deployed in a variety of architectural arrangements within an enterprise. The offer management server provides cross-platform and channel-independent evaluation of offers and offer management for the enterprise.

5 Claims, 3 Drawing Sheets

(56) References Cited

U.S. PATENT DOCUMENTS

| | | | |
|---|---|---|---|
| 2008/0056481 A1* | 3/2008 | Scott | H04L 29/12122 379/355.03 |
| 2008/0222004 A1* | 9/2008 | Pollock | G06Q 30/0603 705/15 |
| 2008/0301419 A1* | 12/2008 | Barros | G06Q 10/0633 712/233 |
| 2009/0131121 A1* | 5/2009 | Ida | G06Q 30/02 455/572 |
| 2009/0138365 A1* | 5/2009 | Mueller | G06Q 20/12 705/14.19 |
| 2009/0248711 A1* | 10/2009 | Martinez | G06F 16/10 |
| 2009/0248738 A1* | 10/2009 | Martinez | G06F 16/337 |
| 2009/0271290 A1* | 10/2009 | Van Luchene | G06Q 20/10 705/26.1 |
| 2010/0319002 A1* | 12/2010 | Gosain | G06F 16/972 719/311 |
| 2011/0029339 A1* | 2/2011 | Callahan | G06Q 10/10 705/7.29 |
| 2011/0047023 A1* | 2/2011 | Lieblang | G06Q 30/02 705/14.36 |
| 2011/0153393 A1* | 6/2011 | Raff | G06Q 10/06398 705/7.42 |
| 2012/0022930 A1* | 1/2012 | Brouhard | G06Q 30/02 705/14.22 |
| 2012/0084166 A1* | 4/2012 | Van Luchene | G06Q 20/10 705/26.2 |
| 2012/0123864 A1* | 5/2012 | Mueller | G06Q 20/12 705/14.53 |
| 2012/0173620 A1* | 7/2012 | Holostov | H04L 67/1048 709/204 |
| 2012/0191509 A1* | 7/2012 | McMurtrie | G06Q 30/02 705/7.36 |
| 2012/0265601 A1* | 10/2012 | Yang | G06Q 30/0207 705/14.38 |
| 2012/0310720 A1* | 12/2012 | Balsan | G06Q 20/204 705/14.26 |
| 2012/0323663 A1* | 12/2012 | Leach | G06Q 30/0239 705/14.25 |
| 2013/0006800 A1* | 1/2013 | Goldberg | G06Q 30/06 705/26.3 |
| 2013/0013404 A1* | 1/2013 | Suprock | G06Q 30/02 705/14.53 |
| 2013/0054474 A1* | 2/2013 | Yeager | G06Q 20/3223 705/71 |
| 2013/0073386 A1* | 3/2013 | Rose | G06Q 40/02 705/14.53 |
| 2013/0097001 A1* | 4/2013 | Dyor | G06Q 30/02 705/14.25 |
| 2013/0117090 A1* | 5/2013 | Priest | G06Q 30/02 705/14.26 |
| 2014/0053227 A1* | 2/2014 | Ruppin | G06F 21/10 726/1 |
| 2014/0067529 A1* | 3/2014 | Blake | G06Q 30/02 705/14.51 |
| 2017/0337564 A1* | 11/2017 | Blake | G06Q 30/02 |

\* cited by examiner

TECHNIQUES FOR CHANNEL-INDEPENDENT OFFER MANAGEMENT

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

In large part due to the advancement and use of technology coupled with the adoption of kiosks, enterprises are trying to find new mechanisms to reach consumers with offers for their goods and services that use the current technology effectively and that are capable of being used by consumers via their own devices or kiosks.

In fact, traditional promotion engines have offered the ability to evaluate promotions but this is for a single end point on a single platform, such as a very specific promotion engine for a specific point of sale device and communication channel.

But, as evidenced from above consumers are now accessing enterprises from multiple channels and devices. Enterprises cannot afford to not have their offer management synchronized and coordinated and yet this is exactly what is occurring in the industry.

SUMMARY

In various embodiments, techniques for channel-independent offer management are presented. According to an embodiment, a method for deployment of offer management is provided.

Specifically, a transaction with a consumer over a first communication channel is identified. Then, offer conditions are evaluated based on the transaction and the consumer. Finally, an offer is delivered, based on the evaluation, to the consumer during the transaction or at the conclusion of the transaction over the first communication channel.

DETAILED DESCRIPTION

Figure 1:
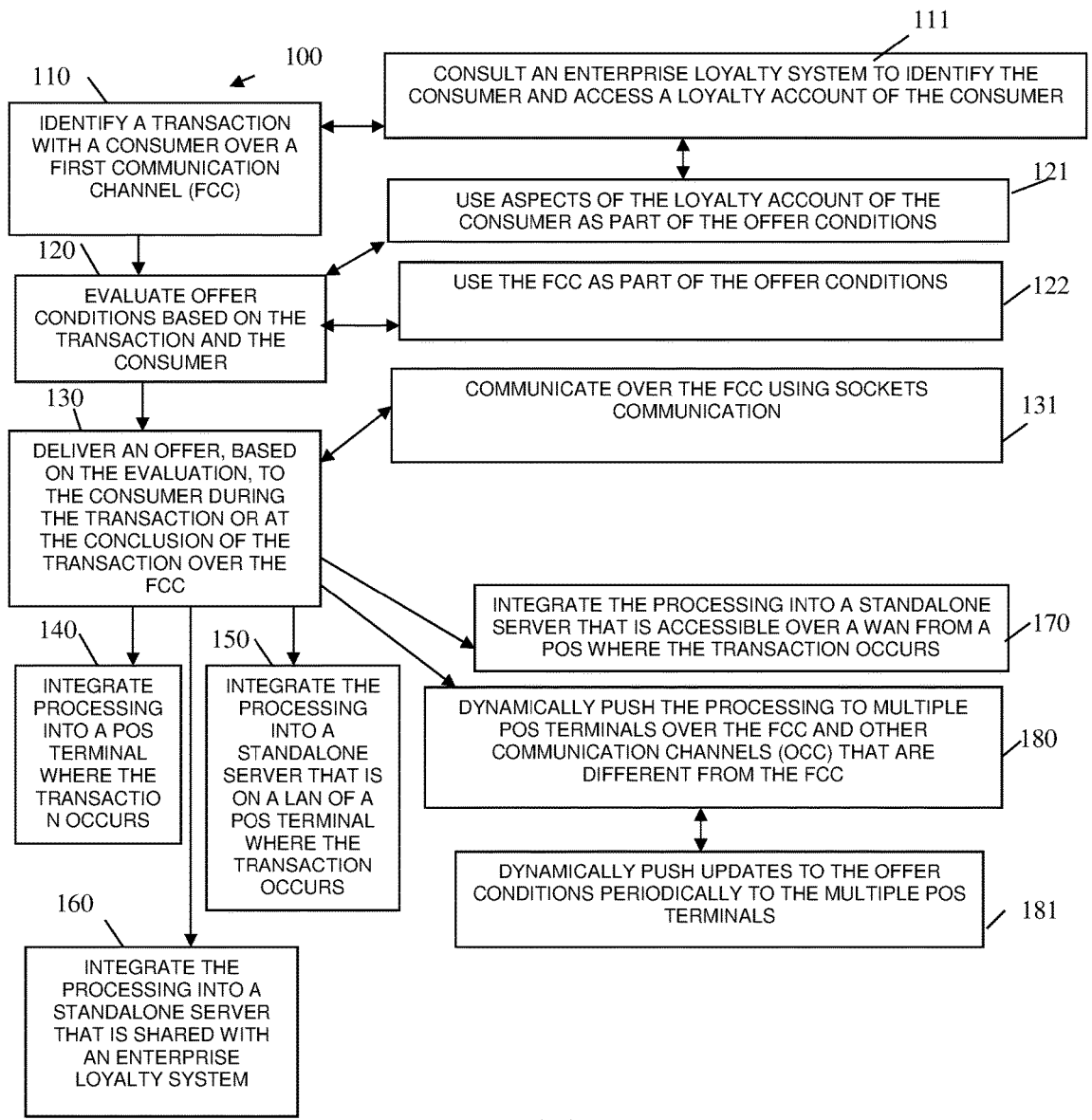
FIG. 1 is a diagram of a method for deployment of offer management, according to an example embodiment.

FIG. 1 is a diagram of a method 100 for deployment of offer management, according to an example embodiment. The method 100 (hereinafter "offer deployment manager") is implemented as instructions programmed and residing on a non-transitory computer-readable (processor-readable) storage medium and executed by one or more processors (e.g., server, cloud, virtual machine (VM), etc.) over a network connection. The processors are specifically configured and programmed to process the offer deployment manager. The offer deployment manager operates over a network. The network is wired, wireless, or a combination of wired and wireless.

At 110, the offer deployment manager identifies a transaction with a consumer over a first communication channel. The transaction emanates from a POS device (which could be a consumer device as discussed below with reference to the FIG. 2). The communication channel can be cellular, Wi-Fi, Bluetooth, Near Field Communication (NFC), Transmission Control Protocol (TCP)/Internet Protocol (IP), and others.

According to an embodiment, at 111, the offer deployment manager consults an enterprise loyalty system to identify the consumer and access a loyalty account of the consumer. That is, often the offer logic to determine an offer for a consumer may in part be based off the consumer's loyalty information. So, the offer deployment manager is in communication with that enterprise loyalty system.

At 120, the offer deployment manager evaluates offer conditions based on at least the transaction (and its details) and the consumer (consumer's identity, etc.).

In an embodiment, at 121 and continuing with the embodiment of 111, the offer deployment manager uses aspects of the loyalty account of the consumer as part of the offer conditions. So, the loyalty tier for the consumer can play a role in resolving offer conditions as can other aspects of the loyalty account.

According to an embodiment, at 122, the offer deployment manager uses the first communication channel (identifier that identifies the first communication channel) as part of the offer conditions.

At 130, the offer deployment manager delivers an offer, based on the evaluation, to the consumer either during the transaction or at the conclusion of the transaction over the first communication channel.

In an embodiment, at 131, the offer deployment manager communicates over the first communication channel using sockets communication.

According to an embodiment, at 140, the offer deployment manager is integrated and pushed to a POS terminal where the transaction occurs. So, the entire processing of the offer deployment manager can exists on POS terminals that operate over different independent and disparate communication channels.

In another case, at 150, the offer deployment manager is integrated and deployed on a standalone sever that is on a local area network (LAN) of a POS terminal where the transaction occurs. It is noted that the LAN can include a plurality of other POS terminals as well for other transactions occurring.

In still another situation, at 160, the offer deployment manager is integrated and deployed on a standalone server that is shared with an enterprise loyalty server. So, the offer deployment manager can coexist on a same server with the enterprise's loyalty services.

In another case, at 170, the offer deployment manager is integrated and deployed over a wide area network (WAN) from a POS terminal where the transaction occurs. Here, the POS terminal and a plurality of other POS terminals can be geographically dispersed over the WAN.

In an embodiment, at 180, the offer deployment manager dynamically pushes a configured instance of itself to multiple POS terminals over the first communication channel and other communication channels that are different from the first communication channel.

Continuing with the embodiment of 180 and at 181, the offer deployment manager dynamically pushes updates to the offer conditions periodically to the multiple POS terminals. So, the offer deployment manager can have multiple instances that cooperate with one another over a network to make offer evaluation platform and channel independent.

Figure 2:
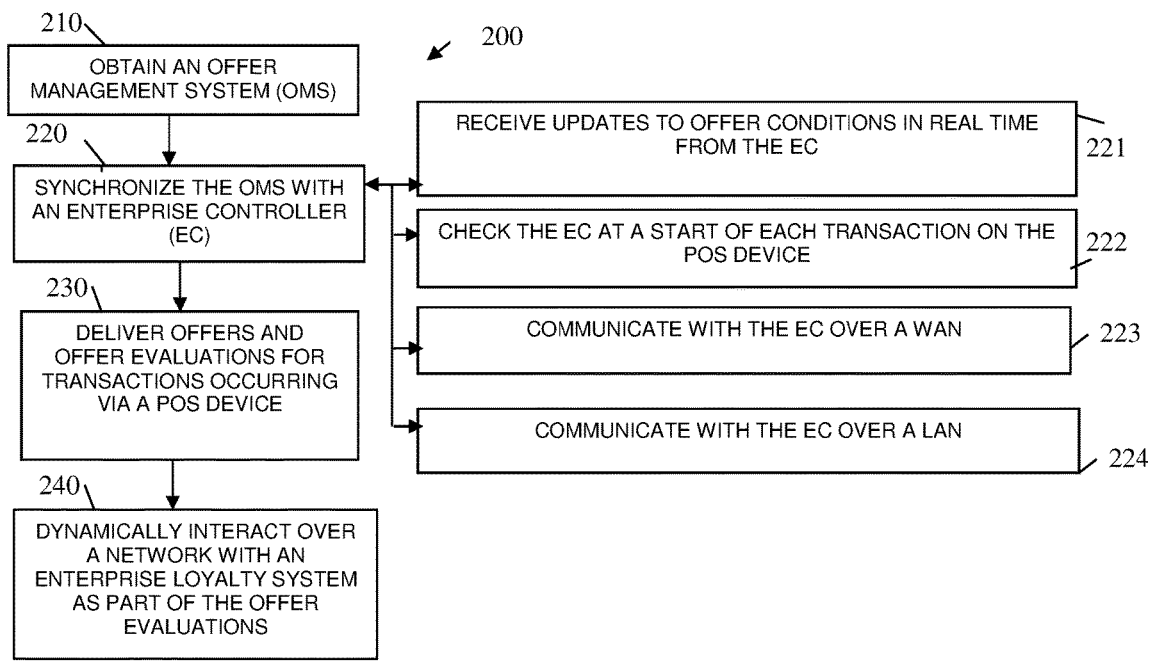
FIG. 2 is a diagram of another method for deployment of offer management, according to an example embodiment.

FIG. 2 is a diagram of another method for deployment of offer management, according to an example embodiment. The method 200 (hereinafter "offer agent") is implemented as instruction and programmed within a non-transitory computer-readable (processor-readable) storage medium that executes on one or more processors of a Point-of-Sale (POS) device, such as: a consumer's mobile device (e.g., smart phone, tablet, PDA, laptop, etc.), a self-service kiosk device, a cashier-manned device, or any computing device for which the customer offer can be delivered (for example within a browser on a desktop computer, laptop, etc.); the processors of these devices are specifically configured to execute the offer agent. The offer agent is also operational over a network; the network is wired, wireless, or a combination of wired and wireless.

The offer agent interacts with the offer deployment manager described above with reference to the FIG. 1 to provide novel techniques for processing offer evaluations in a channel and platform independent manner. That is, it is noted that the offer agent may be deployed to a plurality of POS devices over a network for a variety of communication channels (for instance, as noted above the POS device may be a consumer's own mobile device).

At 210, the offer agent obtains an offer management system. That is, offer evaluation and conditions are obtained in the offer management system. This occurs dynamically and in real time.

At 220, the offer agent synchronizes the offer management system with an enterprise controller. The enterprise controller is a mechanism to manage, initially deploys, and control multiple network instances of the offer agent.

According to an embodiment, at 221, the offer agent receives updates to offer conditions in real time from the enterprise controller. So, the enterprise controller can ensure that regardless of where an instance of the offer agent is deployed it is in synchronization with existing enterprise offer conditions.

In another case, at 222, the offer agent checks with the enterprise controller at a start of each transaction on the POS device where the offer agent operates. This ensures offer conditions and other offer management system features are in compliance at the time of the transaction with enterprise policy.

In still another situation, at 223, the offer agent communicates with the enterprise controller over a WAN.

In other cases, at 224, the offer agent communicates with the enterprise controller over a LAN.

At 230, the offer agent delivers offers and offer evaluations for transactions occurring via the POS device that includes an instance of the offer agent. These offers and offer evaluations remain in synchronization with the enterprise and the other channels where offers are being provided and other platforms using the enterprise controller.

According to an embodiment, at 240, the offer agent dynamically interacts over a network with an enterprise loyalty system as part of the offer evaluations. This situation was discussed above with reference to the FIG. 1.

Figure 3:
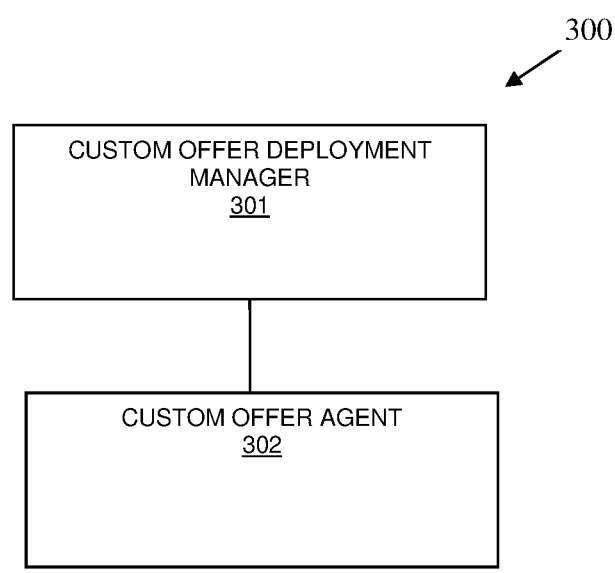
FIG. 3 is a diagram of an offer deployment system, according to an example embodiment.

FIG. 3 is a diagram of an offer deployment system 300, according to an example embodiment, according to an example embodiment. The components of the offer deployment system 300 are implemented as executable instructions and programmed within a non-transitory computer-readable (processor-readable) storage medium that execute on one or more processors of an enterprise server system and one or more processors of a device where custom offers are redeemed and handled as discussed above with reference to the FIGS. 1 and 2; the processors of these devices are specifically configured to execute the components of the offer deployment system 300. The offer deployment system 300 is also operational over a network; the network is wired, wireless, or a combination of wired and wireless.

The offer deployment system 300 includes a custom offer deployment manager 301 and a custom offer agent 302. Each of these components and the interactions of each component are now discussed in turn.

The customized offer deployment and processing system 300 includes one or more processors of an enterprise (retail-based) server, the processors configured with the custom offer deployment manager 301, which is implemented, programmed, and resides within a non-transitory computer-readable storage medium and executes on the one or more processors. Example processing associated with the custom offer deployment manager 301 was presented in detail above with reference to the FIG. 1.

The custom offer deployment manager 301 is configured to the custom offer agent 302 to perform offer management and offer evaluation on the POS device.

In an embodiment, the custom offer deployment manager 301 is configured to configure a plurality of additional POS devices to perform offer management and offer evaluation on these additional POS devices, where a number of the additional POS devices process on different communication channels from one another.

The offer deployment system 300 also includes one or more processors of a POS device (mobile device, self-service kiosk, desktop device, cashier-manned station, etc.), the processors configured with the custom offer agent 302, which is implemented, programmed, and resides within a non-transitory computer-readable storage medium and executes on the one or more processors. Example processing associated with the custom offer agent 302 was presented in detail above with reference to the FIG. 2.

The custom offer agent 302 is configured to synchronize with the custom offer deployment manager 301 when providing offer management and offer evaluation from the POS device.

According to an embodiment, the custom offer agent 302 is configured to interact with an enterprise loyalty system to acquire at least some offer conditions when providing the offer evaluation from the POS device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a Point-Of Sale (POS) device configured to execute the method, comprising:

obtaining, by an agent executing on the POS device, an offer management system that includes conditions for offers and evaluations of the conditions during transaction processing at the POS device by the agent;

processing, by the agent, the offer management system on the POS device as an independent operating offer management system independent from other deployed offer management systems deployed on other POS devices over multiple communication channels and platforms;

synchronizing, by the agent, the offer management system with an enterprise controller over a network, wherein the enterprise controller maintaining synchronization of the offers and the conditions for evaluations over the multiple communication channels and platforms having other executing instances of the agent;

delivering, by the agent, the offers and the evaluations during the transaction processing of transactions on the POS device by checking with the enterprise controller at the start of each transaction on the POS device ensuring that the offers and conditions managed by the offer management system are in compliance at a time of that transaction; and maintaining, by the agent and the other executing instances of the agent, the synchronizing by providing the offers and the conditions to the offer management system of the POS device and the other deployed offer management systems of the other POS devices as channel-independent and multi-channel synchronized offers.

2. The method of claim 1 further comprising, dynamically interacting, by the agent and over the network, with an enterprise loyalty system as part of the offer evaluations.

3. The method of claim 1, wherein synchronizing further includes receiving updates to offer conditions in real time from the enterprise controller.

4. The method of claim 1, wherein synchronizing further includes communicating with the enterprise controller over a wide area network.

5. The method of claim 1, wherein synchronizing further includes communicating with the enterprise controller over a local area network.

* * * * *